US010460001B2

(12) United States Patent
Liang et al.

(10) Patent No.: US 10,460,001 B2
(45) Date of Patent: Oct. 29, 2019

(54) WINDOW SWITCHING METHOD AND DEVICE AND STORAGE MEDIUM THEREOF (71) Applicant: GUANGZHOU UCWEB COMPUTER TECHNOLOGY CO., LTD., Guangdong (CN)

(72) Inventors: Jie Liang, Guangdong (CN); Shunyan Zhu, Guangdong (CN); Tianjue Huang, Guangdong (CN); Rulong Chen, Guangdong (CN); Hongbin Zhao, Guangdong (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 828 days.

(21) Appl. No.: 14/998,317

(22) Filed: Dec. 24, 2015

(65) Prior Publication Data
US 2016/0162595 A1 Jun. 9, 2016

Related U.S. Application Data (63) Continuation of application No. PCT/CN2014/073184, filed on Mar. 11, 2014.

(30) Foreign Application Priority Data

Jun. 28, 2013 (CN) .......................... 2013 1 0269566

(51) Int. Cl.
*G06F 3/0482* (2013.01)
*G06F 16/955* (2019.01)
(Continued)

(52) U.S. Cl.
CPC ........ *G06F 16/9566* (2019.01); *G06F 3/0482* (2013.01); *G06F 3/04842* (2013.01);
(Continued)

(58) Field of Classification Search
CPC .................................................. G06F 17/30861
(Continued)

(56) References Cited

U.S. PATENT DOCUMENTS

2005/0273723 A1* 12/2005 Sharpe ...................... A61F 5/03
715/764
2008/0022229 A1* 1/2008 Bhumkar .............. G06F 16/957
715/838
(Continued)

FOREIGN PATENT DOCUMENTS

CN        101075236 A    11/2007
CN        101325602 A    12/2008
(Continued)

OTHER PUBLICATIONS

International Search Report and Written Opinion for Application No. PCT/CN2014/073184 dated Jun. 5, 2014.
(Continued)

*Primary Examiner* — Jennifer N To
*Assistant Examiner* — Amy P Hoang
(74) *Attorney, Agent, or Firm* — Alston & Bird LLP (57) ABSTRACT Provided are a window switching method, and device and storage medium thereof. The method comprises the steps: obtaining a first pre-reading keyword meeting the requirement in all contents on a page opened through a current window, determining a first pre-reading URL corresponding to the first pre-reading keyword, utilizing the pre-reading window to load a pre-reading page corresponding to the first pre-reading URL, and switching the pre-reading window loaded with the pre-reading page to the current window when an instruction of entering the pre-reading page is received. An improved pre-reading function can be achieved, and the technical problem of low user experience caused by the fact that contents on a pre-reading page cannot be displayed completely after switching to the pre-reading page is further solved.

13 Claims, 2 Drawing Sheets (51) Int. Cl.
*G06F 16/958* (2019.01)
*G06F 3/0484* (2013.01)
*H04L 29/08* (2006.01)
*G06F 16/957* (2019.01)

(52) U.S. Cl.
CPC ........ *G06F 16/9574* (2019.01); *G06F 16/972* (2019.01); *H04L 67/02* (2013.01)

(58) Field of Classification Search
USPC .......................................................... 715/739
See application file for complete search history.

(56) References Cited

U.S. PATENT DOCUMENTS

| | | | |
|---|---|---|---|
| 2008/0114773 A1 | 5/2008 | Choi et al. | |
| 2008/0307334 A1* | 12/2008 | Chaudhri | G06F 3/048 715/764 |
| 2012/0117451 A1* | 5/2012 | You | G06F 3/04883 715/205 |

FOREIGN PATENT DOCUMENTS

| | | |
|---|---|---|
| CN | 101460945 A | 6/2009 |
| CN | 101763267 A | 6/2010 |
| CN | 101763267 A1 | 6/2010 |
| CN | 102663003 A1 | 9/2012 |
| CN | 103376974 A1 | 10/2013 |

OTHER PUBLICATIONS

Office Action from Chinese Patent Application No. 201310269566.X dated Jul. 4, 2016.
Office Action from Chinese Patent Application No. 201310269566.X dated Nov. 3, 2015.
Office Action from Chinese Patent Application No. 201310269566.X dated Oct. 8, 2016.

* cited by examiner

WINDOW SWITCHING METHOD AND DEVICE AND STORAGE MEDIUM THEREOF

CROSS-REFERENCE TO RELATED APPLICATION

This application is a continuation of and claims priority to and the benefit of PCT/CN2014/073184, filed Mar. 11, 2014, which claims priority and the benefit of Chinese Patent Application Serial No. 201310269566.X, filed with the State Intellectual Property Office of P.R. China on Jun. 28, 2013, the content of which is incorporated herein by reference in its entirety.

TECHNICAL FIELD

The invention relates to the technical field of mobile communication, in particular to a window switching method, device and storage medium thereof.

BACKGROUND

Along with social progress and technology development, more and more people use access terminals to wirelessly connect to the Internet or enterprise internal networks to acquire information. In order to improve browsing speed and experience of mobile device browsers, pre-reading function has already been achieved by the mobile device browsers, i.e. webpage pre-reading can be carried out by reading a keyword in advance, and after a pre-reading page is completely loaded, a webpage can be switched to enter the pre-reading page, and the contents of the pre-reading page can be displayed.

However, in implementing a webpage pre-reading process on existing mobile device browsers, due to the fact that nearly all the page contents (for example, pictures of products and the like) are loaded in a layzyload mode, JS (JavaScript) cannot load or display all of the contents (for example, part of the product pictures and the like) in the pre-reading webpage. Thus, the user experience is influenced.

SUMMARY OF THE INVENTION

To address the problem described above, the invention aims at providing a window switching method and device and storage medium thereof.

One aspect of the present invention provides a window switching method, comprising the steps: obtaining a first pre-reading keyword meeting the requirement in all contents on a page opened through a current window, determining a first pre-reading URL corresponding to the first pre-reading keyword, loading a pre-reading page corresponding to the first pre-reading URL by utilizing a pre-reading window, and switching the pre-reading window loaded with the pre-reading page to the current window when an instruction of entering the pre-reading page is received.

Embodiments of the present invention comprise features which will be explained in details and specified in the claims. Some examples are explained in detail in the following illustrations and drawings.

BRIEF DESCRIPTION OF DRAWINGS

Having thus described the example embodiments of the present invention in general terms, reference will now be made to the accompanying drawings, which are not necessarily drawn to scale, and wherein:

DETAILED DESCRIPTION OF THE INVENTION

The present disclosure now will be described more fully with reference to the accompanying drawings, in which some, but not all embodiments of the disclosure are shown. This disclosure may be embodied in many different forms and should not be construed as limited to the embodiments set forth; rather, these example embodiments are provided so that this disclosure will be thorough and complete, and will fully convey the scope of the disclosure to those skilled in the art. Like numbers refer to like elements throughout.

To address the problem encountered when a user desires to switch a webpage to a pre-reading webpage, a second window is established for loading a pre-reading webpage. In other words, the pre-reading page is pre-loaded to the second window when the user is pre-reading the webpage. When a user clicks to enter the pre-reading webpage, seamless switching between the current window and the second window is carried out so as to improve the user experience.

Many modifications and other example embodiments set forth herein will come to mind to one skilled in the art to which these example embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The solution of loading a pre-reading page by establishing a second window is achieved by creating a history management for double-window (a current display window and a pre-reading window for loading the pre-reading page) on a UE browser kernel (WebKit). Specifically, during webpage pre-reading, the pre-reading page is pre-loaded, pre-analyzed, pre-typeset and pre-rendered by establishing a concealed window (namely the pre-reading window). When the user clicks to request to enter a pre-reading page, the current window is switched to the concealed window to achieve a seamless switching between the current page and the pre-reading page. By means of the switching, due to the fact that JS (JavaScript) in bottom layer of WebKit kernel is not involved, JS execution of the pre-reading page is not influenced, and the WebKit kernel completely becomes a black box. In addition, it is easier to update the kernel, and use of the pre-reading function may not be influenced by update of the kernel.

Figure 1:
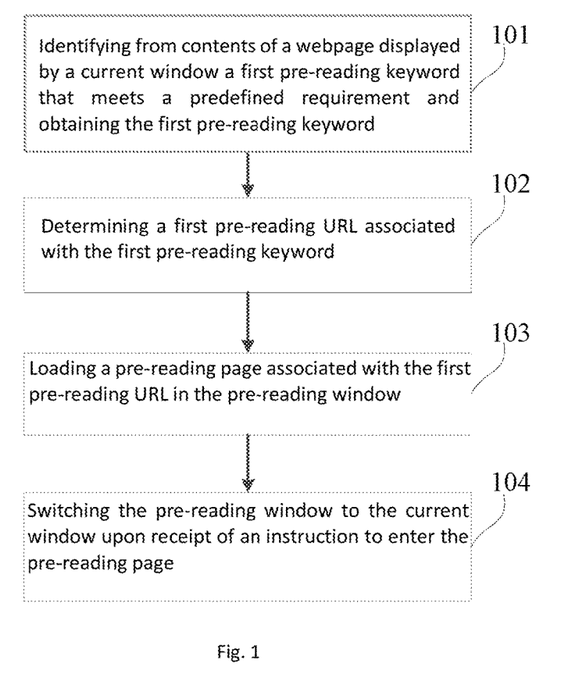
FIG. 1 is a flow chart of a window switching method according to an embodiment of the present invention.

FIG. 1 shows a flow chart of a window switching method according to an embodiment of the invention. As shown in FIG. 1, the window switching method comprises the following:

Step 101: identifying from contents of a webpage displayed by a current window a first pre-reading keyword that meets a predefined requirement and obtaining the first pre-reading keyword. For convenience, the current window refers to the window being displayed.

In this step, after receiving a click operation by user, a UE (User Equipment) browser opens the corresponding page through the display window (a first window). The first pre-reading keyword that meets the predefined requirement is identified from contents of a webpage displayed by the first window. In other words, the UE browser locally scans all the contents of the webpage after receiving the click operation and obtains the pre-reading keyword that meets the predefined requirement. The pre-reading keywords meeting the predefined requirement are words or characters representing pre-reading demands, for example, 'next page', 'next chapter', '≍', '»', '→', '>' and the like. From the view of instruction execution by a system, the UE browser obtains the pre-reading keyword in the opened page by executing a first JS code in the first window.

In this embodiment, one page corresponds to one window during normal page browsing. When a user opens a page through the UE browser, the UE browser executes the first JS code in the first window, and acquires the pre-reading keyword in the page.

The pre-reading keyword can be words of 'next page' and the like, and can also be the contents of next page relevant to the contents being browsed by the user.

After the first pre-reading keyword is obtained, in step 102, a first pre-reading uniform resource locator (the first pre-reading URL) corresponding to the first pre-reading keyword is determined.

Based on the above steps, the pre-reading URL (Uniform Resource Locator) associated with the pre-reading keyword is obtained when the pre-reading keyword obtained by the UE browser is in compliance with predefined rules. For convenient description, in this embodiment, the pre-reading URL associated with the first pre-reading keyword is defined as the first pre-reading URL. The pre-reading keyword in compliance with predefined rules is the pre-reading keyword having pre-reading possibility or meeting specified pre-reading keyword identification condition. In operation, identifying a pre-reading keyword can be implemented by searching a preset pre-reading keyword list or using a preset syntactic rule to identify whether the first pre-reading keyword is in compliance with predefined rules.

Then in step 103, a first pre-reading page associated with the first pre-reading URL is loaded in the pre-reading window.

In this step, after the first pre-reading URL is determined, the pre-reading page associated with the first pre-reading URL is loaded in the pre-reading window (namely the concealed window, and can also be called a second window relative to the first window). In other words, the contents of the pre-reading page associated with the first pre-reading URL are pre-loaded to the pre-reading window (the second window or the concealed window), and the loading process may not influence browsing of the web page in the current window (the first window or the display window). The browser displays the contents of the pre-reading page loaded in the second window upon receipt of a user's click.

The pre-reading window can be a window created for the pre-reading page or a window already opened besides the current window.

Alternatively, in another embodiment, after the first pre-reading URL is determined, the method further comprises determining whether a pre-reading window exists. If not, a pre-reading window is created. If yes, the existing pre-reading window is used to directly load the pre-reading page associated with the first pre-reading URL.

In addition, as an example, during normal page browsing, only one window (namely the first window) exists in the beginning, when a pre-reading page is desired to be loaded, it is determined whether the pre-reading window (namely a concealed window or invisible window) that is used for loading the pre-reading page exists. If the pre-reading window exists, the existing pre-reading window is used to load the pre-reading page associated with the first pre-reading URL. Otherwise, a pre-reading window is created. Then the created pre-reading window is used to load the pre-reading page associated with the first pre-reading URL.

It should be explained that, in this embodiment, after the pre-reading window is created, the pre-reading window serves as a second window and will exist along with the current window (namely the first window or the display window) because the pre-reading window maintains forward and backward history.

In step 104, upon receipt of an instruction to enter the pre-reading page, the browser switches the pre-reading window to be the display window.

In this embodiment, when a user clicks a URL (link) associated with the pre-reading keyword through a human-machine interaction interface, the browser will receive a message associated with the click, and determine whether the content associated with the link being clicked is being pre-read or has been pre-read. If the determination result is yes, the instruction to enter the pre-reading page associated with the first pre-reading URL has been received, and the display window is switched from the first window to the concealed window (namely the pre-reading window or the second window) loaded with the pre-reading page according to the instruction. In other words, regardless whether the page of the pre-reading link (namely the pre-reading page associated with the first pre-reading URL) is completely loaded, the current window can be switched from the first window (display window) to the second window (pre-reading window or concealed window) associated with the webpage that is being loaded or has been loaded based upon a switch instruction or an instruction of displaying the pre-reading page associated with the first pre-reading URL. When the switching operation is completed, the second window (pre-reading window or concealed window) becomes the current window to display. The first window becomes the concealed window or the pre-reading window in which pre-reading webpage may be loaded.

Therefore, in this embodiment, even when the pre-reading page is not completely loaded, the pre-reading page can also be effectively loaded by means of backstage. Unlike the prior art, if the pre-reading page is not completely loaded, the pre-reading page may be re-loaded upon receipt of a switch instruction to enter the pre-reading window associated with the pre-reading page. Alternatively, when a forward button on tool bar is clicked, it can also be directly switched to the pre-reading window associated with the pre-reading page while the pre-reading page is being loaded.

During pre-reading page, pre-loading page is implemented by means of an established pre-reading window (concealed window). Upon receipt of a click operation by a user to request to enter a pre-reading page, seamless switching between the current display window (the first window) and the pre-reading window (the second window) is achieved so as to improve the user's experience. Meanwhile, the seamless switching will not influence JS switching in bottom layer of the browser.

Optionally, in another embodiment, after the pre-reading page associated with the first pre-reading URL is loaded, the window switching method can further comprise displaying loading progress of the pre-reading page associated with the first pre-reading URL in the current window. For example, displaying the loading progress can be implemented by changing the color of a forward button on current tool bar or the color of the pre-reading keyword in the webpage, or in the form of a prompt window.

In addition, the prompt window can also display the loading progress of the pre-reading page associated with the first pre-reading URL in the form of a progress bar or other visible forms.

In other words, a segment of JS codes is executed in the current window (namely the first window) to change the color of the pre-reading keyword in the webpage and/or change the color of the forward button of the current tool bar, or display several prompt windows over the current window to display the loading progress of the pre-reading page. For example, after the pre-reading page is completely loaded, the color of the pre-reading keyword or the color of the forward button of the current tool bar will gradually become the preset color such as green.

In order to achieve continuous pre-reading and enable a user to obtain continuous and uninterrupted page browsing experience, after the webpage is opened in the pre-reading window, a second pre-reading keyword that meets pre-defined requirement can be identified and obtained from contents of a webpage displayed by the pre-reading window (second window). A second pre-reading URL associated with the second pre-reading keyword is determined. A webpage with which the second pre-reading URL associated is loaded in the first window (the canceled window or the pre-reading window). When the instruction to enter the first window is received, the current window (or display window) is switched to the first window (pre-reading or concealed window) with the second pre-reading URL being loaded, and the webpage associated with the second pre-reading URL is displayed in the first window.

In other words, upon receipt of a switch instruction, the pre-reading window, namely the second window, becomes the current window or the display window. The first window becomes a concealed window (a new pre-reading window). If a new pre-reading page need to be pre-read, the process is similar to the above process, a second pre-reading keyword that meets predefined requirement can be identified and obtained from contents of a webpage displayed in the pre-reading window. The second pre-reading keyword in the webpage displayed in the current window (the second window) is first obtained. Then a second pre-reading URL associated with the second pre-reading keyword is loaded in the first window (the pre-reading window). Upon receipt of an instruction to enter the webpage associated with the second pre-reading URL, the display window is switched to the pre-reading window (namely the first window) loaded with the second pre-reading URL. The first window becomes the current window to display.

In this embodiment, one page corresponds to one window in normal page browsing. However, a concealed window needs to be established when a pre-reading page exists, and the concealed window is used for pre-loading webpage. It should be explained that once the concealed window is established, the concealed window will exist along with the current window because the concealed window maintains forward and backward history.

Figure 2:
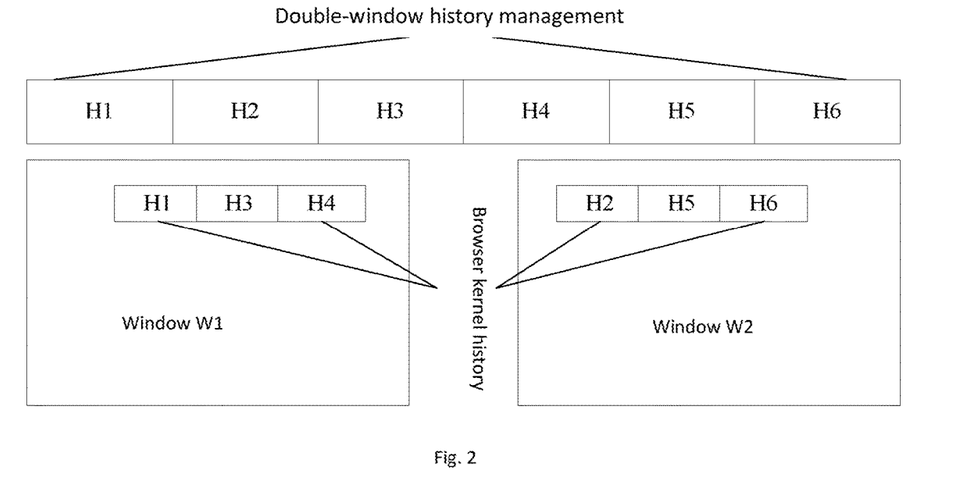
FIG. 2 is a schematic diagram of management of historical items according to an embodiment of the present invention.

That is to say, for the browser kernel (WebKit), history management capable of managing double-window is desired. The history management diagram is shown in FIG. 2. In FIG. 2, webpage H1 and webpage H6 are taken as examples. Examples are not limited to webpage H1 and webpage H6.

FIG. 2 shows an exemplary history management according to an embodiment of the invention. In FIG. 2, only a window W1 can be established when each page is browsed normally, a window W2 will be established for pre-reading use. The two windows have same priority. Once the window W2 is established, the window W2 will be closed only when the window W1 is closed. A technology of accelerating program starting speed is adopted for pre-reading. According to the main principle, main contents of commonly used programs are read when a webpage is browsed or a computer is started to load an operating system in case a large amount of time is consumed to read data of the program when the program is started.

When the current webpage is H1 and a pre-reading page H2 needs to be loaded, the window W2 is established to load the pre-reading page H2. Webpage being displayed is switched from webpage H1 to webpage H2. Window W2 becomes the current window. Webpage H2 is displayed in the current window. A new pre-reading page H3 then needs to be pre-loaded. The window W1 is used for pre-reading. The pre-reading page H3 is then displayed in the window W1, namely the webpage being displayed is switched to the webpage associated with history H3 in the window W1. A link associated with webpage H4 in webpage H3 is then clicked. Webpage H4 is directly loaded in the current window W1 because it is not pre-reading. When pre-reading is needed in webpage H4, a pre-reading page H5 will be loaded in the window W2. A link associated with a webpage H6 in webpage H5 is then clicked. The webpage H6 will be directly loaded in the current window, namely window W2.

For example, when a backward button in webpage H5 is clicked, it needs to be switched to the window W1 to display the webpage. Because the current page displayed in the window W1 is H4, forward and backward functions of WebKit are not needed to be called, when the backward button is clicked again, forward and backward functions of WebKit are called in the current window W1, and webpage H3 is retrieved. When the backward button is clicked again, webpage H2 is retrieved. Webpage H5 is currently displayed in the window W2, webpage H2 is retrieved by calling the forward and backward functions of WebKit. Then the current window is switched from window W1 to the window W2. Window W2 becomes the current window. The contents are displayed in the window W2.

The history known by users are from webpage H1 to webpage H6 shown in the uppermost layer. From the perspective of the browser, double-window history management is implemented to sort display histories of two windows.

Figure 3:
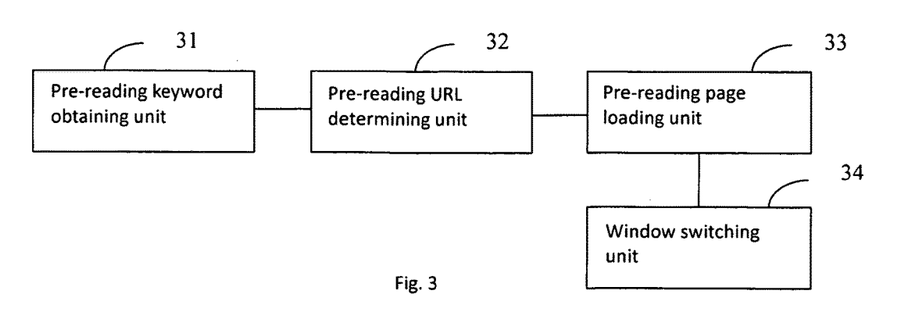
FIG. 3 is a frame schematic diagram of a window switching device according to an embodiment of the present invention.

The embodiment of the present invention may further provide a window switching device corresponding to the window switching method. FIG. 3 shows a diagram of the window switching device according to an embodiment of the invention.

As shown in FIG. 3, the window switching device provided by the invention comprises a keyword obtaining unit 31, a pre-reading URL determining unit 32, a pre-reading page loading unit 33 and a window switching unit 34.

The pre-reading keyword obtaining unit 31 is configured to identify from contents of a webpage displayed by a current window a first pre-reading keyword that meets a predefined requirement and obtain the first pre-reading keyword. The pre-reading keywords meeting the predefined requirement are words or characters capable of representing pre-reading demand, for example, 'next page', 'next chapter', '≈', '»', '→', '>', and the like.

The pre-reading URL determining unit 32 is configured to determine a first pre-reading URL associated with the first pre-reading keyword. The URL may be determined by searching the JS code associated with the URL from a data base.

The pre-reading page loading unit 33, by using an established window for pre-reading (pre-reading window), is configured to load a pre-reading page associated with the pre-reading URL that is determined by the pre-reading URL determining unit 32.

The window switching unit 34 is configured to switch the pre-reading window loaded with the pre-reading page to the current window upon receipt of an instruction to enter the pre-reading page.

Figure 4:
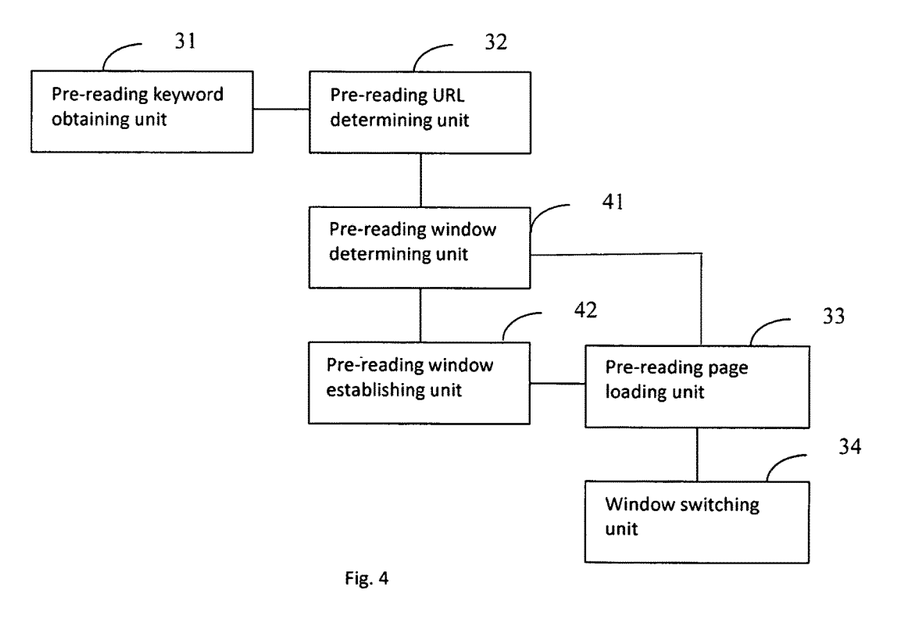
FIG. 4 is a frame schematic diagram of a window switching device according to another embodiment of the present invention.

Optionally, the window switching device may further comprise a pre-reading window determining unit 41 and a pre-reading window establishing unit 42. The schematic diagram of the window switching device is shown in FIG. 4. The pre-reading window determining unit 41 is configured tb determine whether a pre-reading window exists after the first pre-reading URL is determined by the pre-reading URL determining unit 32. If the pre-reading window determining unit 41 determines the pre-reading window does not exist, the pre-reading window determining unit 41 sends the determination result to the pre-reading window establishing unit 42. If the pre-reading window determining unit 41 determines the pre-reading window exists, the pre-reading window determining unit 41 sends the determination result to the pre-reading page loading unit 33.

The pre-reading window establishing unit 42 is configured to establish a pre-reading window for loading the pre-reading page upon receipt of the determination result that the pre-reading window does not exist.

The pre-reading page loading unit 33 is configured to load the pre-reading page corresponding to the first pre-reading URL in the established pre-reading window after the pre-reading window establishing unit 42 establishes a pre-reading window for loading the pre-reading page.

Optionally, the window switching device may further comprise a prompt unit. The prompt unit is configured to display the loading progress of the pre-reading page in the current window after the pre-reading page loading unit completes loading the pre-reading page.

Specifically, the prompt unit is configured to display the loading progress of the pre-reading page by changing the color of the forward button on current tool bar and/or changing the color of the pre-reading keyword in the webpage after loading of the pre-reading page is completed by the pre-reading page loading unit.

The pre-reading keyword obtaining unit 31 is further configured to identify from contents of a webpage displayed by the pre-reading window a second pre-reading keyword that meets the predefined requirement and obtain the second pre-reading keyword.

The pre-reading URL determining unit is further configured to determine a second pre-reading URL corresponding to the second pre-reading keyword.

The pre-reading page loading unit is further configured to load a page of the second pre-reading URL in the first window.

The window switching unit is further configured to switch the first window display the webpage associated with the second pre-reading URL to the current window upon receipt of an instruction to enter the webpage associated with the second pre-reading URL. In other words, the pre-reading window loaded with the second pre-reading webpage becomes the current window.

Optionally, the window switching device can be integrated in a server or can be an independent device which is not limited by the embodiment.

In addition, when a display window is switched to a concealed window, steps of the method have been described above, and are not repeated here.

Specific embodiments are described below.

At first step, when browser receives an instruction by a user to open Taobao website in PC version the Taobao website is displayed. A certain product such as shoes is searched based upon user's need. The window then displays a webpage for searching shoes.

At second step, browser receives a pre-reading keyword 'next page' (namely a pre-reading page) in the current webpage. The pre-reading keyword is obtained by user using JS code. Pre-reading URL corresponding to the pre-reading keyword is then returned to the browser.

At third step, the browser establishes an invisible window and enables the invisible window to load the pre-reading webpage associated with the pre-reading URL.

At last step, upon receipt of instruction to switch the current page to the pre-reading page (namely the next page), the browser implements switching operation between the current window and the invisible window. The invisible window becomes the current window to display the pre-reading webpage after switching operation is completed and becomes visible. The window previously used as current window to display a webpage becomes an invisible window.

In the prior art, pictures of product are loaded on the pre-reading page in a LazyLoad mode. The page can be pre-loaded through the existing pre-reading function of a UC browser. But after it is switched to the pre-reading page, a user may find that only three or four pictures of dozens of products are displayed on the webpage. The rest of pictures are not displayed. This is a problem existing in switching operations between current window and pre-reading window, resulting in incorrect execution of JS. In embodiments of the present invention, because the JS code in bottom layer is not involved in switching operation, all the product pictures on the pre-reading page can be loaded. The JS can be correctly executed.

In addition, along with development of HTML5, more and more new functions will be introduced. The functions such as sensors can be executed on the pre-reading page. For example, in the prior art, some information and data of a sensor can be obtained by executing a segment of JS codes. However, functions of the sensor cannot be executed due to the fact that the JS code cannot be executed in the pre-reading page. In the example embodiments of the present invention, a concealed window is established to pre-load the pre-reading page. When the pre-loading page is displayed by user's click operation, switching between the current window and the concealed window is implemented to achieve seamless switching between the current page and the pre-reading page. In this manner, JS in the bottom layer of the WebKit is not involved in switching operation. JS execution of the pre-reading page may not be influenced. Example embodiments of the present invention take advantage of properties of HTML5.

It can be seen that seamless switching between the current page and the pre-reading page is implemented by the double-window switching method and device, thus improving user experience. Kernel update is facilitated. It is unnecessary to modify a kernel code. The pre-reading function can also be used although it is switched to an original WebKit kernel, so that the browser kernel can be independently published. In addition, The JS can be normally executed, the stability is improved, and meanwhile, the hidden danger of breakdown which may exists have existed before can also be avoided.

In the embodiment of the invention, UE can be any one of the following devices, either static or mobile. Specifically, the static UE comprises a terminal, a mobile station, a subscriber unit or a station and the like. Mobile UE comprises a cellular phone, a PDA (personal digital assistant), a modem, wireless communication equipment, a handheld device, a laptop computer, a cordless phone or a WLL (wireless local loop) and the like. The UE can be distributed in the whole wireless network. In the embodiments described above, the browser may be a UE browser.

It should be explained that, relation and relative terms used herein, such as the first and the second, are only used for distinguishing one entity or operation from another entity or operation, and it is not required or suggested to necessarily have any of the practical relations or sequence between the entities or operations. Furthermore, the terms 'comprise', 'include' or any other variants aim to be non-exclusive, so that not only a series of elements such as the process, method, article or device included, but also other elements unlisted are included. Furthermore, the inherent elements of the process, method, article or device are included. Under the condition without more limitation, the elements limited by the sentence 'comprises a . . . ' are non-exclusive to additional same elements besides the process, method, article or device of the elements.

By means of the description of the implementation modes, those skilled in the art can clearly understand that the invention is achieved by aids of software and necessary general hardware platforms, of course, the invention can be achieved by hardware, but the former one may be a better implementation mode under some conditions. Based on the understanding, essentially, the contribution of the technical scheme of the invention to the prior art can be reflected through a software product, the computer software product can be stored in a storage medium, such as an ROM/RAM, disc and compact disc. The computer software product comprises a plurality of instructions used for enabling a computer device (personal computer, server, or network equipment and the like) to execute the embodiments or methods of some parts of the embodiments.

Therefore, the invention further provides a computer-readable storage medium with a program code capable of being executed by a processor, wherein when executed, the program code can enable the processor to execute the steps in the window switching method.

The window switching method device and the storage medium are described with reference of drawings and examples. However, the skilled in the field should understand that various improvements can be made on the basis without departing from the contents of the window switching method, device and storage medium. Therefore, the protection scope of the invention should be determined by the contents of the claims attached.

The invention claimed is:

1. A computer-implemented window switching method, comprising the steps:
    establishing a first window and a pre-reading window on a mobile device;
    locally scanning contents of a webpage displayed by a current display window to identify a first pre-reading keyword that meets a predefined requirement of representing pre-reading demands on the webpage loaded in the first window, wherein the first window is the current display window and wherein the first pre-reading keyword comprises contents of next page relevant to contents being browsed by a user,
    causing to display the current display window on the mobile device such that the pre-reading window is concealed,
    determining a first pre-reading URL corresponding to the first pre-reading keyword,
    determining whether the pre-reading window is established on the mobile device,
    in an instance when the pre-reading window is established on the mobile device, loading a pre-reading webpage corresponding to the first pre-reading URL in the established pre-reading window,
    in an instance when the pre-reading window is not established on the mobile device, creating the pre-reading window, and
    in response to receiving an input instruction to the first pre-reading URL, switching the current display window to the pre-reading window loaded with the pre-reading webpage.

2. The computer-implemented window switching method according to claim 1, wherein after loading of the pre-reading webpage corresponding to the first pre-reading URL is completed, the method further comprises:
    causing to display, in the current display window, a prompt indicating progress of loading the pre-reading webpage corresponding to the first pre-reading URL.

3. The computer-implemented window switching method according to claim 2, wherein causing to display the prompt further comprises changing a color of a navigation user interface element of a current tool bar.

4. The computer-implemented window switching method according to claim 2, wherein causing to display the prompt further comprises changing a color of the pre-reading keyword on the webpage.

5. The computer-implemented window switching method according to claim 2, wherein causing to display the prompt further comprises establishing a prompt window suspending over the current display window.

6. The computer-implemented window switching method according to claim 1, wherein the first window is regarded as a new pre-reading window after switching the current display window to the pre-reading window loaded with the first pre-reading URL, and the computer-implemented window switching method further comprises the steps:
    scanning to identify a second pre-reading keyword on the pre-reading webpage loaded in the current display window;
    determining a second pre-reading URL corresponding to the second pre-reading keyword;

loading a second pre-reading webpage of the second pre-reading URL in the new pre-reading window, and in response to receiving an input instruction to the second pre-reading URL, switching the current display window to the new pre-reading window loaded with the second pre-reading webpage.

7. A device, comprising at least one processor and at least one memory including computer program instructions, the at least one memory and the computer program instructions, with the at least one processor, causing the device at least to perform window switching operations comprising:

establishing a first window and a pre-reading window on the device;

locally scanning contents of a webpage displayed by a current display window to identify a first pre-reading keyword that meets a predefined requirement of representing pre-reading demands on the webpage loaded in the first window, wherein the first window is the current display window and wherein the first pre-reading keyword comprises contents of next page relevant to contents being browsed by a user;

causing to display the current display window on the device such that the pre-reading window is concealed;

determining a first pre-reading URL corresponding to the first pre-reading keyword;

determining whether the pre-reading window is established on the mobile device;

in an instance when the pre-reading window is established on the mobile device, loading a pre-reading webpage corresponding to the first pre-reading URL in the established pre-reading window;

in an instance when the pre-reading window is not established on the mobile device, creating the pre-reading window; and in response to receiving an input instruction to the first pre-reading URL, switching the current display window to the pre-reading window loaded with the pre-reading webpage.

8. The device according to claim 7, wherein the at least one memory and the computer program instructions, with the at least one processor, cause the device to perform the window switching operations comprising:

causing to display, in the current display window, a prompt indicating progress of loading the pre-reading webpage corresponding to the first pre-reading URL.

9. The device according to claim 8, wherein causing to display the prompt further comprises:

changing a color of a navigation user interface element of a current tool bar, changing a color of the pre-reading keyword on the webpage, or establishing a prompt window suspending over the current display window.

10. The device according to claim 7, wherein the first window is regarded as a new pre-reading window after switching the current display window to the pre-reading window loaded with the first pre-reading URL, and the at least one memory and the computer program instructions, with the at least one processor, cause the device to perform the window switching operations comprising:

scanning to identify a second pre-reading keyword on the pre-reading webpage loaded in the current display window, determining a second pre-reading URL corresponding to the second pre-reading keyword, loading a second pre-reading webpage of the second pre-reading URL in the new pre-reading window, and in response to receiving an input instruction to the second pre-reading URL, switching the current display window to the new pre-reading window loaded with the second pre-reading webpage.

11. A computer program product comprising at least one non-transitory computer-readable storage medium with program codes capable of being executed by a processor, wherein when executed by the processor, cause the processor to execute the following steps:

establishing a first window and a pre-reading window on a mobile device;

locally scanning contents of a webpage displayed by a current display window to identify a first pre-reading keyword that meets a predefined requirement of representing pre-reading demands on the webpage loaded in the first window, wherein the first window is the current display window and wherein the first pre-reading keyword comprises contents of next page relevant to contents being browsed by a user;

causing to display the current display window on the mobile device such that the pre-reading window is concealed;

determining a first pre-reading URL corresponding to the first pre-reading keyword;

determining whether the pre-reading window is established on the mobile device;

in an instance when the pre-reading window is established on the mobile device, loading a pre-reading webpage corresponding to the first pre-reading URL in the established pre-reading window;

in an instance when the pre-reading window is not established on the mobile device, creating the pre-reading window; and in response to receiving an input instruction to the first pre-reading URL, switching the current display window to the pre-reading window loaded with the pre-reading webpage.

12. The computer-implemented window switching method according to claim 1, wherein upon switching the current display window to the pre-reading window loaded with the pre-reading webpage, the first window previously the current display window operates as a new pre-reading window.

13. The computer-implemented window switching method according to claim 1, wherein the pre-reading demands are associated with forward functionality and backward functionality.

* * * * *

UNITED STATES PATENT AND TRADEMARK OFFICE
CERTIFICATE OF CORRECTION

PATENT NO. : 10,460,001 B2
APPLICATION NO. : 14/998317
DATED : October 29, 2019
INVENTOR(S) : Jie Liang et al.

It is certified that error appears in the above-identified patent and that said Letters Patent is hereby corrected as shown below:

On the Title Page

"(71) Applicant: GUANGZHOU UCWEB COMPUTER TECHNOLOGY CO., LTD., Guangdong (CN)" should read --"(71) Applicant: GUANGZHOU UCWEB COMPUTER TECHNOLOGY CO., LTD., Guangzhou (CN)--

Signed and Sealed this
Twenty-first Day of January, 2020

Andrei Iancu
*Director of the United States Patent and Trademark Office*